June 25, 1929.　　　　L. LAING　　　　1,718,745
MIXER
Filed June 1, 1927

Inventor
L. Laing.
By Lacey & Lacey, Attorneys

Patented June 25, 1929.

1,718,745

UNITED STATES PATENT OFFICE.

LAWRENCE LAING, OF MARSHALL, MICHIGAN.

MIXER.

Application filed June 1, 1927. Serial No. 195,754.

This invention relates to agitators and more particularly to a mixer in which paint or other materials may be agitated and the ingredients thereof thoroughly mixed together.

One object of the invention is to provide a mixer including a receptacle and a cover removably engaged with the upper end thereof and carrying an agitator disposed within the receptacle when the cover is in place and also carrying an electric motor to impart motion to the agitating means when the mixer is in use.

Another object of the invention is to so arrange the motor upon the cover that the shaft of the agitator may be disposed vertically in axial relation to the receptacle and the motor constitute a weight which will retain the cover in place upon the receptacle.

Another object of the invention is to provide improved means for mounting the motor upon the cover and allow the motor and its base to be removed from the cover as a unit or allow the motor to be removed without disturbing its base and the agitator rotatably carried thereby.

Another object of the invention is to cause a swirling motion to be imparted to the paint or other material placed in the receptacle and to some extent interrupt the swirling motion and thereby cause the ingredients of the material to be thoroughly intermingled.

The invention is illustrated in the accompanying drawing, wherein

Figure 1:
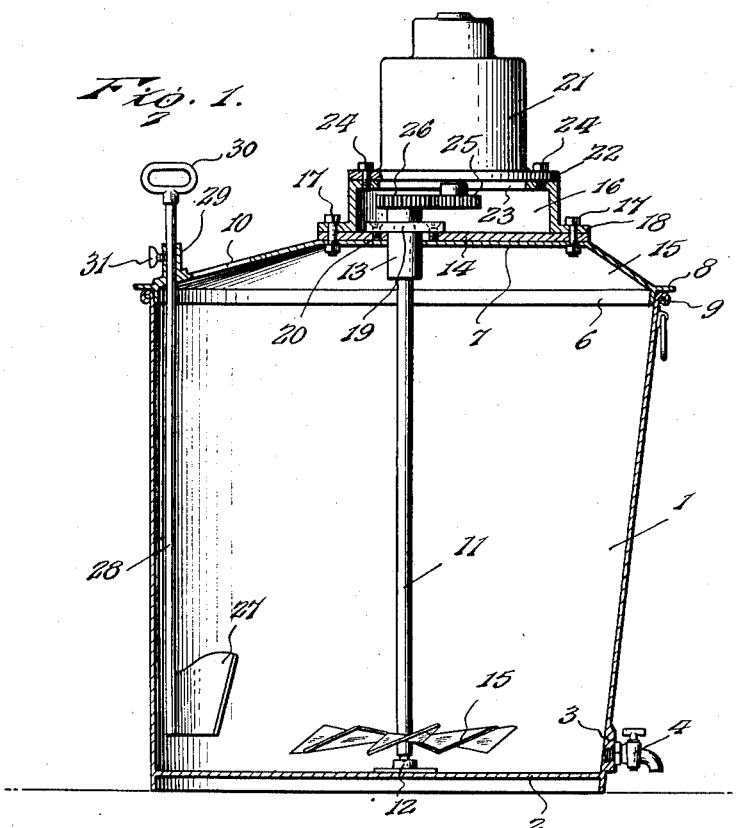
Figure 1 is a vertical sectional view through the improved mixer.

The improved mixer includes a receptacle 1 which is open at its upper end and gradually increases in diameter from its bottom 2 towards its upper end. A portion of its annular wall has been thickened near its bottom and formed with a threaded opening in which is screwed a draw cock 4 through which the contents of the receptacle may be drawn off.

The cover 5 of the receptacle rests upon the open upper end thereof and is formed with a depending annular flange 6 which fits into the receptacle in engagement with the walls thereof and prevents the cover from having sliding movement upon the receptacle. The cover is formed with a flat portion 7 disposed eccentrically thereof and from its flat portion slopes downwardly toward its margins where it terminates in a circumferentially extending lip 8 which rests upon the rolled upper edge portion 9 of the receptacle. An opening 10 is formed in the cover and constitutes a sight opening through which the contents of the receptacle may be viewed while being mixed. If desired, this opening may be provided with a transparent closure so that the contents of the receptacle may not pass outwardly through it.

In order to agitate and thoroughly mix the contents of the receptacle, there has been provided an agitating shaft 11 disposed vertically in the receptacle in axial relation thereto and having its lower end removably seated in a bearing 12 and its upper end portion 13 which is of increased diameter passed through an opening formed in the cover and through a registering opening formed in a plate 14 which rests upon the flattened portion 7 of the cover. Blades 15 extend radially from the shaft 11 adjacent its lower end and are disposed at an incline, as shown in Fig. 1, so that when the shaft rotates a whirling motion will be imparted to the contents of the receptacle. The plate 14 which constitutes a bottom plate for a housing or motor base 16 is secured by bolts 17 which also pass through an outstanding flange 18 formed with the housing 16, and this plate carries a split bearing 19 which is removably secured by screws 20 and fits into a circumferentially extending groove formed in the enlarged portion 13 of the shaft 11. Therefore, the shaft will be rotatably supported and when the cover is removed will be withdrawn from the receptacle. The motor 21 is a conventional form of electrically operated motor and at its lower end is formed with an outstanding annular flange 22 which rests upon the inwardly extending flange 23 of the housing 16 and is secured thereto by bolts or the like 24. The shaft of the motor extends downwardly into the housing or motor base and carries a gear 25 which meshes with a gear 26 upon the upper end of the agitator shaft. It will thus be seen that when the motor is in operation rotary motion will be imparted to the agitator shaft and the blades 15 which extend from the lower end of the shaft and constitute a mixing wheel will impart a whirling motion to the contents of the receptacle. It should be further noted that the weight of the motor and its base will serve to retain the cover firmly in place upon the receptacle and prevent it from moving out of proper position thereon. When it is necessary to repair the motor, the bolts 24 may be removed and the motor lifted from the base. It will also be obvious that when necessary the bolts 17 may be removed and the motor together with its base lifted from the cover. The bearing 19 can then be detached and the shaft will be released from the cover and plate. The gears 25 and 26 are, of course, detachably secured so that they may be removed when necessary.

Figure 2:
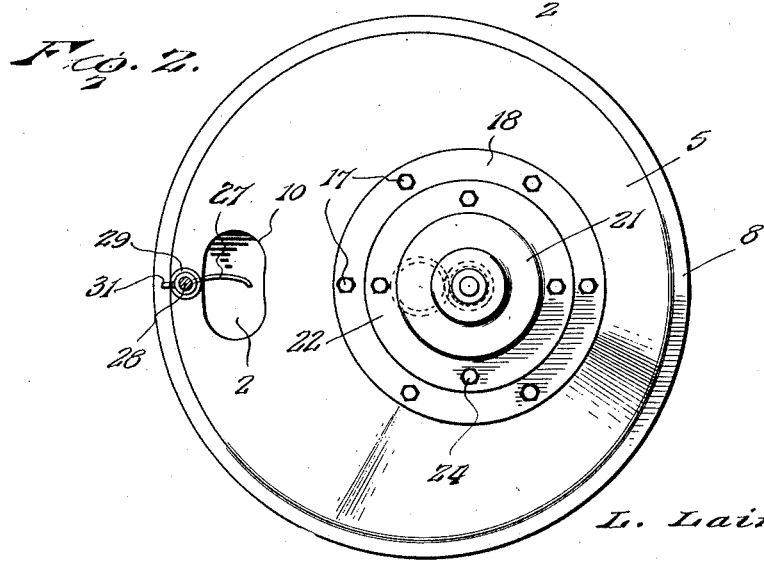
Fig. 2 is a top plan view of the mixer.

In order to interrupt the swirling motion imparted to the contents of the receptacle, there has been provided a blade 27, the shank or stem 28 of which extends vertically in the receptacle and is passed through a bearing 29 carried by the cover 5. At its upper end the stem is provided with a hand hold 30 by means of which it may be grasped and easily slid through the bearing to vertically adjust the position of the blade and a set screw 31 is carried by the bearing so that the blade may be retained in the adjusted position. It should be noted that the blade is curved, as shown in Fig. 2, so that by turning the stem in the bearing the blade may be disposed close to the wall of the receptacle substantially parallel thereto and the blade prevented from interrupting swirling motion of the contents of the receptacle when so desired.

The concave face of the blade 27 is presented to the blades 15 and the baffle blade 27 flares upwardly so that it effectually turns the whirling currents upwardly to insure thorough agitation of the entire contents of the receptacle. The baffle blade is so mounted that its stem is located immediately adjacent the sight opening 10 in the cover and the adjustment of the blade may be observed so that it may be very easily and accurately set in the position desired in any given case.

Having thus described the invention, I claim:

In a mixer, a receptacle, a cover for the receptacle having a bearing thereon, a shaft rotatably supported by the cover and extending axially within the receptacle and having agitating blades carried thereby, said blades being disposed near the bottom of the receptacle, a stem movable in the receptacle and vertically and rotatably adjustable in the bearing, a baffle blade fixed to the lower end of the stem and swingable toward or away from the receptacle wall upon rotating the stem, said baffle blade being vertically adjustable upon adjusting the stem vertically to position the baffle blade opposite the agitating blades or in planes above said blades.

In testimony whereof I affix my signature.

LAWRENCE LAING. [L. S.]